July 7, 1959  D. B. LANE  2,893,683
BLEEDER VALVES
Filed June 22, 1953  2 Sheets-Sheet 1
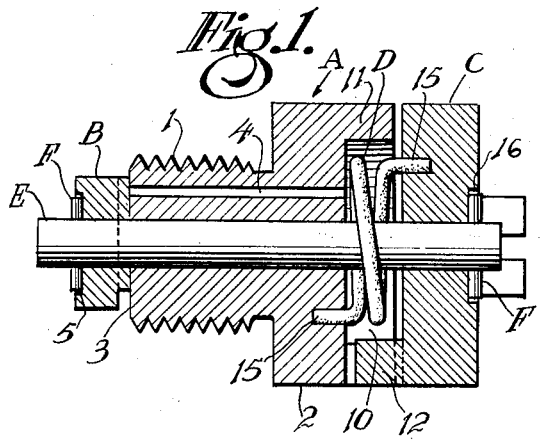
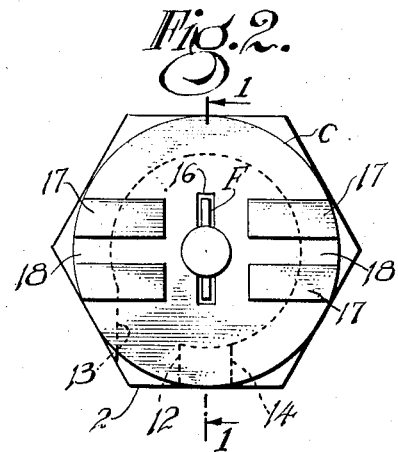
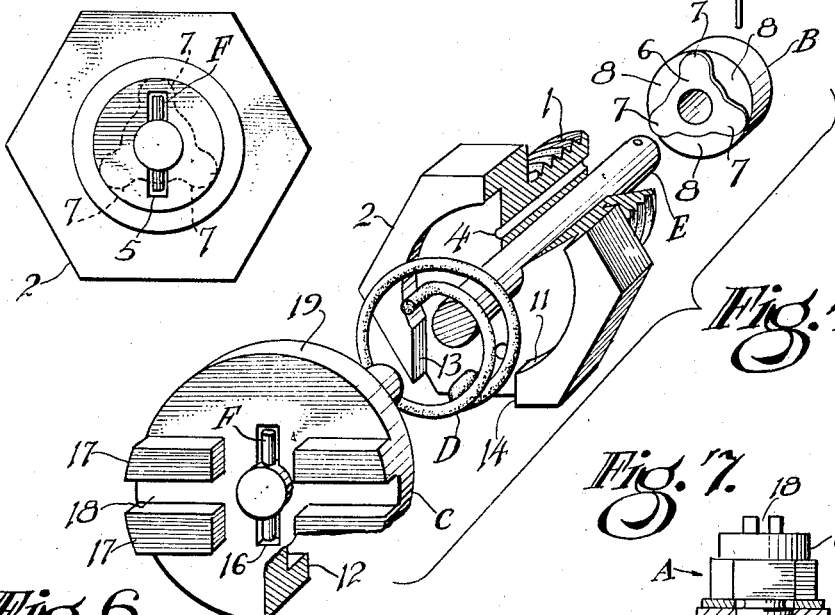
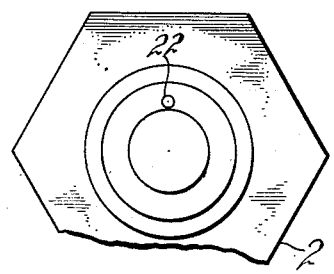
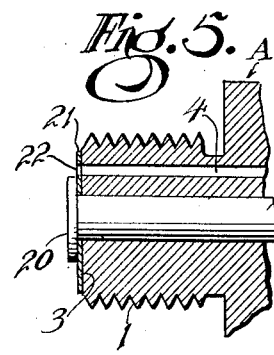
INVENTOR.
Donald Bruce Lane
BY
ATTORNEYS July 7, 1959
D. B. LANE
2,893,683
BLEEDER VALVES
Filed June 22, 1953
2 Sheets-Sheet 2
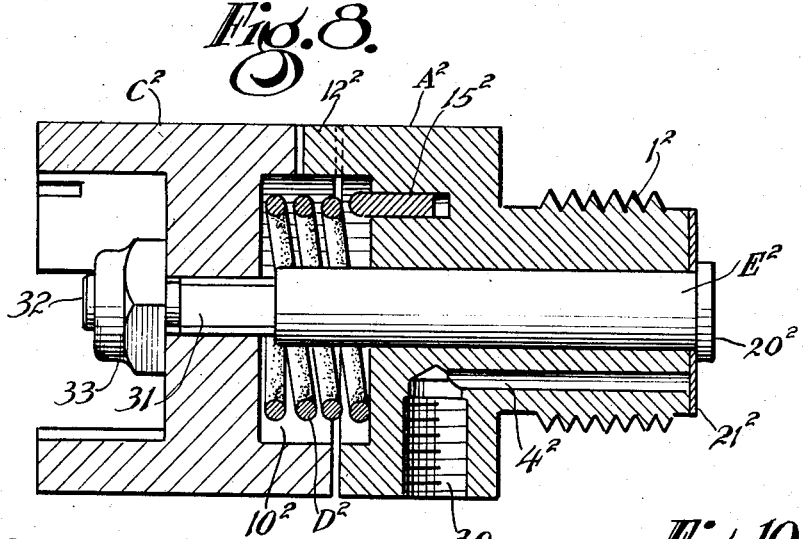
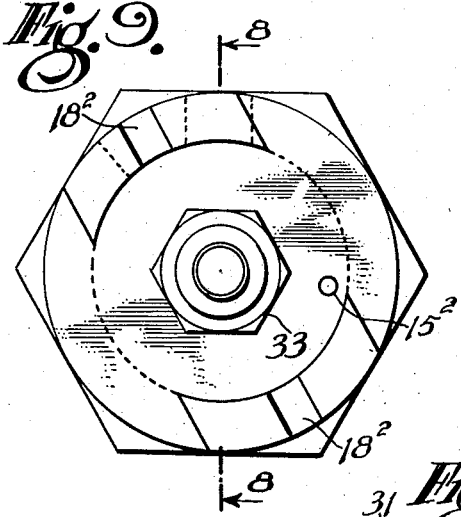
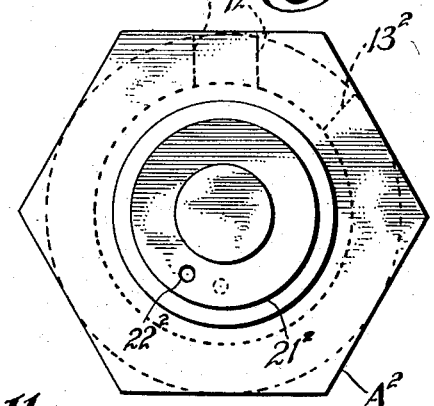
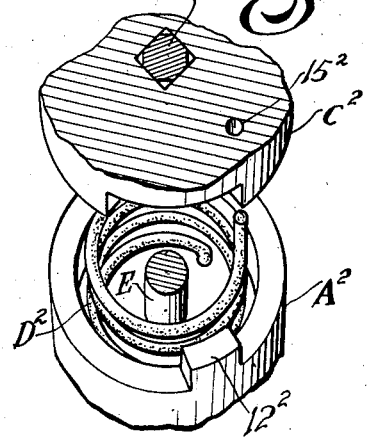
INVENTOR.
Donald Bruce Lane
BY
ATTORNEYS

United States Patent Office 2,893,683
Patented July 7, 1959

---

2,893,683

BLEEDER VALVES

Donald Bruce Lane, Roslyn Heights, N.Y.

Application June 22, 1953, Serial No. 363,157

3 Claims. (Cl. 251—180)

This invention relates to improvements in bleeder valves.

In general, the presence of a compressible fluid, such as air, in a hydraulic system operated by an incompressible fluid, such as oil, is highly undesirable. The presence of incompressible fluid in a compressible fluid system may also impair the operation, as, for example, clogging of valves by accumulated lubricating oil or condensation in a compressed air system. It is, therefore, general practice in hydraulic systems to provide pockets at upper or lower points in the system (depending on whether the undesired fluid is the gas or the liquid) for collecting the undesired fluid, together with bleeder valves for withdrawing the fluid collected in the pockets.

The bleeder valves now in common use are wrench operated, requiring special wrenches in locations where access is difficult and preventing their use in some locations where bleeding would be desirable. Unless the design is unduly complex, heavy and expensive, the valves are easily subject to damage by excessive tightening and to leakage due to insufficient tightening.

It is an object of the invention to provide a bleeder valve capable of general use in hydraulic systems and which may be operated without a wrench or special tools.

A further object is to provide a valve which is operable in locations having minimum clearance space around the valve.

A still further object is to provide a valve which automatically returns to a definite closed position, thereby eliminating possibility of damage due to careless or unskilled manipulation of the valve.

Other objects and advantages will appear in the following full description.

Valves embodying the invention in preferred forms will now be described with reference to the accompanying drawing and the features forming the invention will then be pointed out in the appended claims.

In the drawing:

Figure 1 is an axial section, on the line 1—1 of Figure 2, of a valve embodying the invention in one preferred form;

Figures 2 and 3 are, respectively, outer and inner end elevations;

Figure 4 is an exploded perspective;

Figure 5 is a fragmentary axial section, showing a modification of the valve of Figure 1;

Figure 6 is an end elevation of the modified valve of Figure 5;

Figure 7 shows the valve of Figure 1 in place in the wall of a hydraulic line;

Figure 8 is an axial section, taken on the line 8—8 of Figure 9, showing a further modification;

Figures 9 and 10 are, respectively, outer and inner end elevations of the valve of Figure 8; and Figure 11 is a fragmentary, exploded perspective, showing the cap $C^2$ and plug $A^2$ separated, in position prior to assembly.

Referring now to Figures 1 to 4, the valve parts include a plug A, valve body B, operating cap C, a spring D urging the operating cap C away from the plug A and rotatively toward valve closing position, an operating shaft E connecting the cap C and valve body B, and pins F passing through the shaft E and holding the parts together against the axial thrust of spring D.

The plug A has a threaded inner section 1 adapted to be screwed into a standard fitting as indicated in Figure 7, and an enlarged hexagonal outer section 2 to take a wrench for screwing the valve into such a fitting. The inner end 3 of the plug is ground flat at right angles to the plug axis and a discharge bore 4 passing through the flat surface 3 forms a discharge port therein. Shaft E passes through an axial bore in the plug A and is coupled to the valve member B by pin F fitting in a groove 5 in the member B. The face 6 of the member B against the surface 3 is ground flat and relieved to form three lobes 7, separated by recessed areas 8. When a lobe 7 is aligned with bore 4, the valve is closed, and turning the valve body B through sixty degrees, or thereabouts, will bring a recess 8 over the bore 4, thus opening the valve.

The outer face of plug A is recessed to form a chamber 10 for accommodating the spring D, and the wall 11 surrounding the recessed area is cut away to accommodate a projection 12 on the operating cap C and form abutments 13 and 14 for engagement by the projection 12 so as to limit rotary movement of the cap C with respect to the plug A. The ends of the coil spring D are bent, as indicated, and received in bores 15 in the plug A and cap C.

The outer face of cap C has a groove 16, in which the pin F fits, and is formed with lugs 17 which are slotted as at 18 to take a screw driver. The outer surface 19 of the cap may also be knurled for turning with the fingers. Spring D is dimensioned so as to be compressed axially when the parts are assembled as in Figures 1 to 3, and so as also to be stressed or preloaded torsionally when the parts are so assembled. Thus, when the bores 15 are diametrically opposed, as indicated, a spring D having its ends 190° apart when unstressed may be used, giving 10° of preload when assembled. The bores 15 may, however, be located in any desired position, so as properly to preload a given spring to a desired extent.

In assembly, all the parts may be put together with the exception of the pin F at the outer end of the shaft E, and with the cap C separated from plug A so as to clear the projection 12 axially from the wall 11. Thereafter, the cap C is turned to bring the projection 12 over the opening between abutments 13 and 14, and the cap C is then pushed into contact with the plug A. This creates clearance for inserting pin F through the outer end of shaft E, and upon releasing the cap C, spring D forces the cap slightly away from plug A, seating the pin F in the groove 16. The assembly is now completed. As will be apparent, the parts have no tendency to come apart or to turn, even under severe vibration.

In operation, the workman merely inserts a screw driver in the slots 18 of the lugs 17 and turns the screw driver (to the right in Figure 2) until projection 12 meets abutment 13. This brings a recess 8 over the bore 4 and permits the air or other unwanted fluid to discharge through the bore. When the oil or other operating fluid starts to appear, the screw driver is released and spring D returns the valve to closed position, with projection 12 against abutment 14.

The axial stressing of spring D need not be heavy, but only sufficient to seal against leakage under low pressure conditions. Under high pressure conditions, the pressure of the fluid itself will seat valve surface 6 firmly against the cooperating surface 3, providing an effective seal under high and widely varying pressures.

The fit of shaft E in general is not critical, except where it passes through valve body B. At this point, the fit should be close enough to prevent leakage or a seal may be provided in any other convenient way.

In the embodiment of Figures 5 and 6, the structure of the valve body and inner shaft end are altered, the construction being otherwise the same. In this modification, the inner end of the shaft E is formed with a head 20 and the valve body takes the form of a washer 21, brazed or soldered to the head 20 and having an opening or port 22 positioned to be operable with respect to the bore 4. The operation is the same as in the case of the valve of Figure 1, turning the shaft E between its two limit positions, bringing opening 22 into and out of registry with the bore 4 for opening and closing the valve.

Figures 8 to 11 illustrate still another modification. The parts are generally similar to those of the embodiment of Figures 1 to 4, and are identified by similar reference characters with the superscript 2, and require further description only as to points of difference.

In this case, the projection $12^2$ is formed on the plug $A^2$ and cooperates with abutments $13^2$ and $14^2$ formed in the cap $C^2$. The chamber $10^2$ accommodating spring $D^2$ is also formed partly in the one element and partly in the other. Discharge bore $4^2$, instead of leading to this chamber, leads to a tapped cross bore 30. Exhaustion of the fluid to be bled will be more immediately indicated by appearance of the hydraulic fluid at this point than by leakage out of the spring housing as in the previously described structures. A plug may be screwed into the bore 30 to prevent entrance of dirt during shipment and possibly clogging of the bore or to close off the valve in case of failure.

The valve plate structure is generally similar to that of Figures 5 and 6, the shaft $E^2$ having a head $20^2$ supporting washer plate $21^2$ having aperture $22^2$ adapted to register with bore $4^2$ in the plug. The structure attaching shaft $E^2$ to the operating cap $C^2$ locates the plate $21^2$ angularly with respect to the cap.

Shaft $E^2$ has a square section 31 passing through a square opening in cap $C^2$ and the shaft end 32 beyond this square section is threaded. The cap $C^2$ is held on the shaft $E^2$ by means of a lock nut 33 of any suitable standard type, the usual elastic stop nut being suitable, for example. The assembly is the same as with the previously described constructions, except that the desired spacing between cap $C^2$ and plug $A^2$ is established by inserting a shim, screwing down the lock nut 33, and then removing the shim.

What is claimed is:

1. A rotative disk bleeder valve comprising in combination, a ported plug having a valve seat at one end, a discharge passage extending through the plug, an intermediate threaded section and an enlarged section at its other end, an operating shaft rotatably mounted in the plug, a valve disk carried by one end of the shaft in cooperating relation to the valve seat, an operating cap attached to the other end of the shaft, and a coil spring having its ends fixed to the plug and cap respectively and preloaded in compression and torsion for holding the disk against its seat and urging it toward a closed position, the cap being of less diameter than the enlarged section of the plug to permit gripping the plug with a wrench without gripping the cap.

2. A valve according to claim 1, in which the enlarged section of this plug is a hexagon.

3. A valve according to claim 2, in which the cap cross section is substantially a circle inscribed in the hexagon.

References Cited in the file of this patent

UNITED STATES PATENTS

| 1,081,968 | Kitts | Dec. 23, 1913 |

FOREIGN PATENTS

| 54,034 | Germany | May 15, 1890 |
| 476,984 | Italy | Jan. 7, 1953 |